No. 668,247. Patented Feb. 19, 1901.
H. F. & W. H. WUSSOW.
MATCH MACHINE.
(Application filed June 8, 1900.)
(No Model.) 10 Sheets—Sheet 1.

Fig. 1.

Witnesses.

Inventors
Herman F. Wussow
William H. Wussow
By Benedict & Morsell
Attorneys.

No. 668,247. Patented Feb. 19, 1901.
H. F. & W. H. WUSSOW.
MATCH MACHINE.
(Application filed June 8, 1900.)
(No Model.) 10 Sheets—Sheet 5.

Fig. 5.

Witnesses. Inventors

No. 668,247. Patented Feb. 19, 1901.
H. F. & W. H. WUSSOW.
MATCH MACHINE.
(Application filed June 8, 1900.)

(No Model.) 10 Sheets—Sheet 7.

No. 668,247. Patented Feb. 19, 1901.
H. F. & W. H. WUSSOW.
MATCH MACHINE.
(Application filed June 8, 1900.)
(No Model.) 10 Sheets—Sheet 8.

Witnesses.
Inventors
Herman F. Wussow
William H. Wussow
By Benedict & Morsell
Attorneys.

No. 668,247. Patented Feb. 19, 1901.
H. F. & W. H. WUSSOW.
MATCH MACHINE.
(Application filed June 8, 1900.)
(No Model.) 10 Sheets—Sheet 9.

No. 668,247. Patented Feb. 19, 1901.
H. F. & W. H. WUSSOW.
MATCH MACHINE.
(Application filed June 8, 1900.)
(No Model.) 10 Sheets—Sheet 10.

UNITED STATES PATENT OFFICE.

HERMAN F. WUSSOW AND WILLIAM H. WUSSOW, OF OSHKOSH, WISCONSIN, ASSIGNORS TO CHARLES A. WUSSOW, OF SAME PLACE.

MATCH-MACHINE.

SPECIFICATION forming part of Letters Patent No. 668,247, dated February 19, 1901.

Application filed June 8, 1900. Serial No. 19,561. (No model.)

*To all whom it may concern:*

Be it known that we, HERMAN F. WUSSOW and WILLIAM H. WUSSOW, of Oshkosh, county of Winnebago, and State of Wisconsin, have invented a new and useful Improvement in Match-Machines, of which the following is a description, reference being had to the accompanying drawings, which are a part of this specification.
Our invention relates to improvements in match-machines of that class that are adapted to cut the match-sticks from blocks of wood, to insert the sticks in an endless traveling carrier in which they are carried to devices by which paraffin or other inflammable material is applied to the sticks and therefrom to other devices by which an ignitible composition is applied to one end of the sticks, forming an ignitible head, and thence for a long distance in the air, whereby they are dried and the inflammable material and ignitible composition become hardened, and to other devices by which the matches are discharged from the carrier.
Our invention includes improved devices and mechanism adapted for accomplishing the foregoing-enumerated results and other devices and mechanism incidental or related thereto.
The invention consists of the machine and its parts and combinations of parts, as herein described and claimed, or the equivalents thereof.

In the drawings,
Fig. 27 is a view of the edge of the form of carrier shown in Fig. 26.

Figure 17:
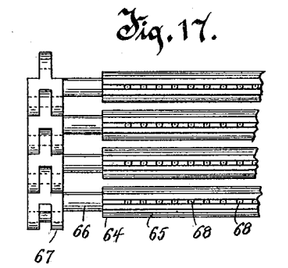
Fig. 17 is a view of the rear side of a fragment of the match-carrier.
Figure 18:
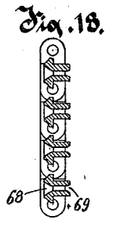
Fig. 18 is a transverse section of a fragment of the carrier through stick-receiving apertures therein.
Figures 22, 23:
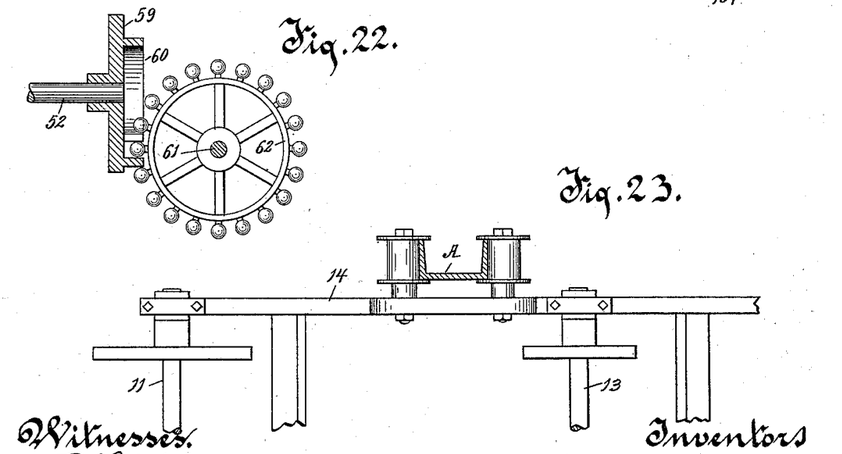
Fig. 23 is a plan view of a fragment of a construction shown in Fig. 6 in connection with the frame for raising and lowering the match-carrier above the paraffin and composition pans.

In the drawings, A is a frame, of such size and form as is adapted for supporting thereon the operative mechanism and devices employed in connection therewith. The match-carrier 1 is a long flexible endless belt or apron made up of a large number of bars, (substantially as shown in Figs. 17 and 18,) which are linked together, and is carried on wheels or disks, the driving-wheels being provided with teeth that intermesh with the bars of the carrier. That portion of the carrier at the front of the machine is moved or caused to travel intermittingly, being driven by the toothed wheels on shafts 3 and 4, Fig. 2. These shafts are each provided with two spur-geared wheels, near the respective ends thereof, that intermesh with the bars of the carrier adjacent to the links by which they are connected together at their ends, Fig. 17. All the wheels supporting the carrier and by which it is driven or on which it is carried are in pairs on shafts therefor. The rear portion of the carrier is driven or is caused to travel continuously by means of spur-geared wheels on shafts 5 and 6, the teeth of the wheels intermeshing with the bars of the carrier. Those portions of the carrier between the intermittingly-moving and the continuously-moving parts thereof are mounted, respectively, on wheels or disks in pairs on the shafts 7 and 8, which shafts are severally mounted in tiltable yielding arms 9 and 10, whereby the tension of the carrier is maintained and the slack required at the junction of the intermitting and continuous movements is provided for. Directly above the paraffin and the composition pans the carrier runs on wheels on shafts 11, 11', 12, and 13, which shafts are mounted on an auxiliary vertically-movable frame 14, Figs. 2, 6, and 23, whereby provision is made for raising and lowering the carrier above the paraffin and composition pans. In other parts of its route the carrier runs on a number of wheels on shafts 15, mounted directly on the frame, and also on wheels on shafts 16 and 17, which shafts 16 and 17 are respectively mounted in the tiltable arms 18 and 19. The arms 19 are connected by springs 20 to the frame, and the construction including the wheels on shaft 17 is adapted to hold the carrier taut, taking up any slack therein between the wheels on shafts 3 and 4. The arms 18 are held yieldingly toward the front of the machine, bringing the wheels on shaft 16 against the carrier and taking up slack therein by means of weights 21 21, connected to the free ends of the arms 18 by cords 22, running over pulleys 23 and 24. The arms 9 and 10 are connected together by a rod 25, whereby the wheels on the shafts 7 and 8, respectively, are actuated compensatingly, so that the wheels on one shaft shall take up the slack of the carrier while the other one concurrently yields or permits of a slight amount of slack, thus providing for giving slack at one end of that portion of the carrier that moves intermittingly and concurrently for taking up the slack at the other end of that portion of the carrier that moves intermittingly. The ancillary frame 14 is mounted movable vertically on the carrier and is counterpoised by weights 26, connected thereto by cords 27, running over pulleys 28 and 29 on the frame. For raising and lowering the ancillary frame 14 with the shafts and wheels thereon and that portion of the carrier that is carried on those wheels, rods 30 are employed, connecting the frame 14 to crank-arms on rock-shafts 31 31', which rock-shafts are connected by a rod 32, jointed to radial arms on the rock-shafts, and one of the rock-shafts is connected by a rod 33 connecting a radial arm on the rock-shaft to a radial arm on another rock-shaft 34, which latter rock-shaft 34 is provided with a crank-handle 35, by means of which the attendant may raise or lower the auxiliary frame 14, thereby lifting the carrier away from the paraffin and the composition pans, Figs. 1, 2, 3, 4, and 6.

Figure 1:
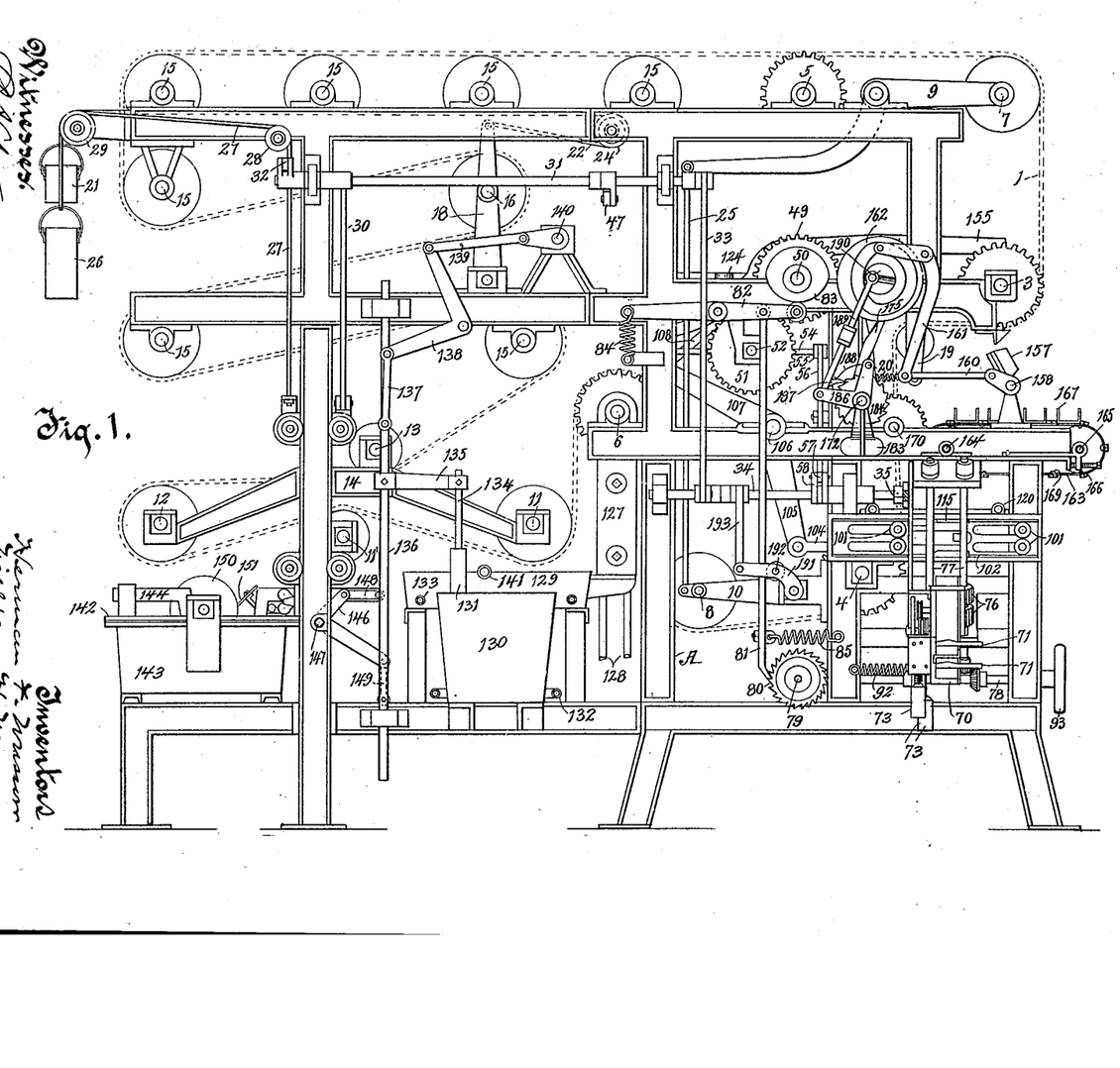
Figure 1 is an elevation of one side of the machine, showing chiefly so much of the machine as is at that side thereof.
Figure 2:
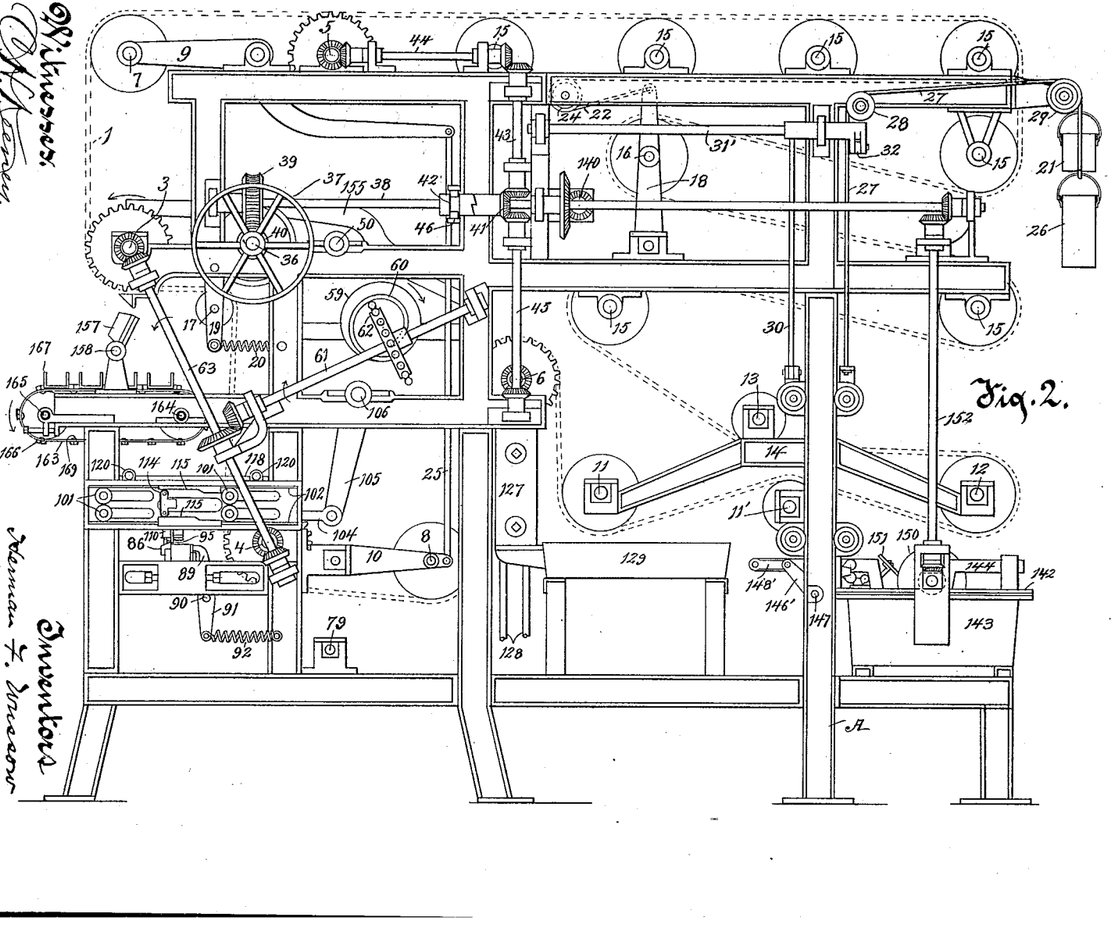
Fig. 2 is an elevation of the opposite side of the machine, showing chiefly so much of the machine as is at that side thereof.
Figure 3:
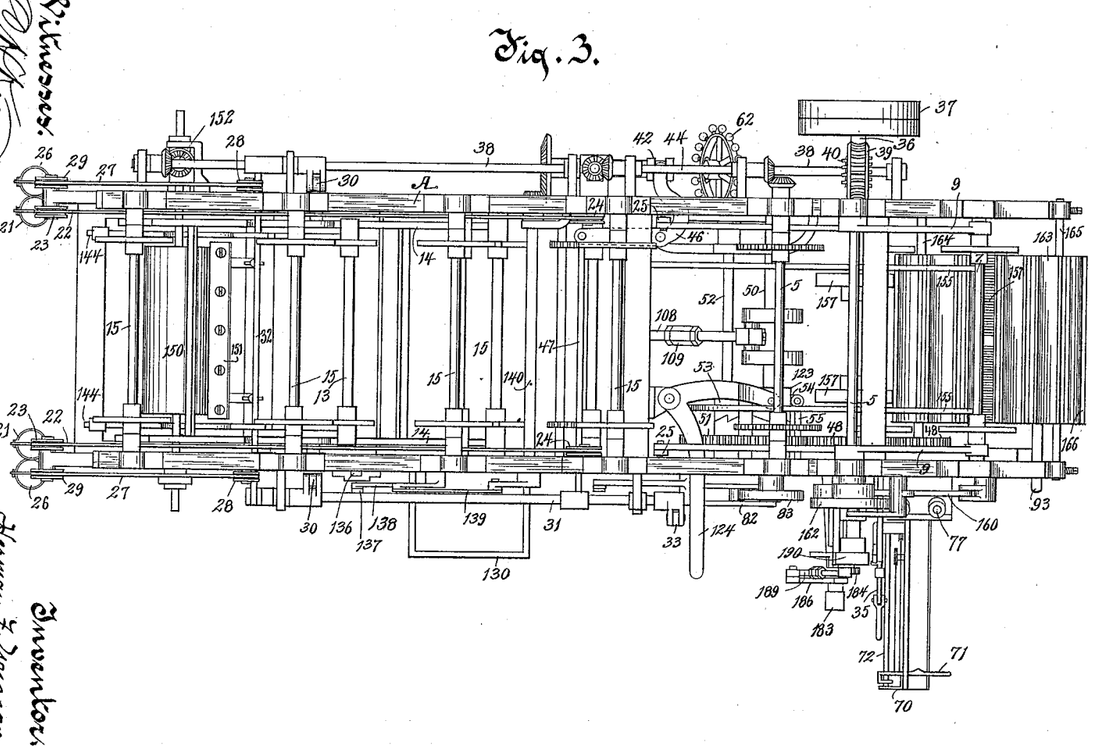
Fig. 3 is a top plan view of the machine.
Figure 4:
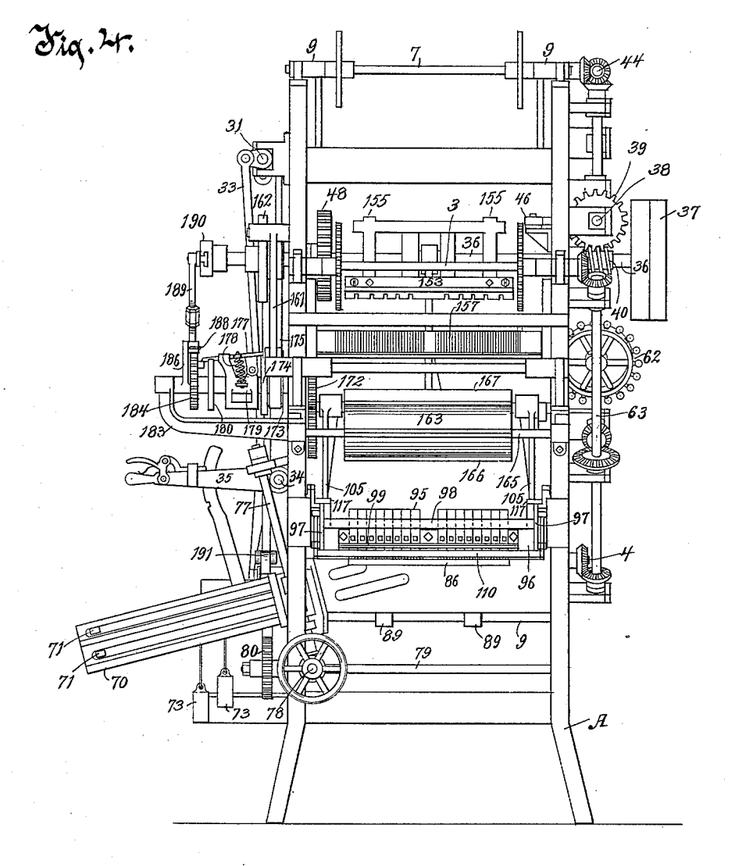
Fig. 4 is an elevation of the end of the machine at the right in Fig. 1.
Figure 5:
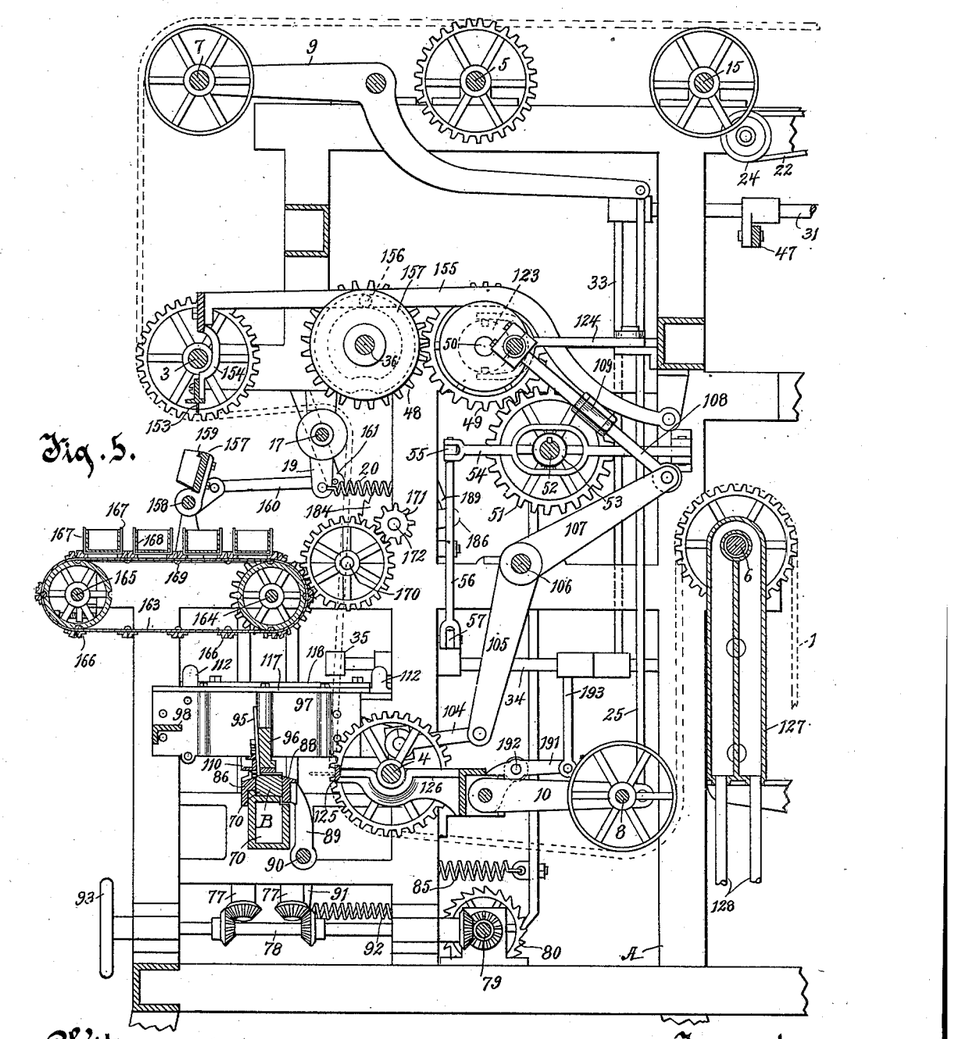
Fig. 5 is a vertical section centrally longitudinally of the front portion of the machine at the right in Fig. 1.

For driving the operative mechanism of the machine a driving-shaft 36, provided with a band-pulley 37, is mounted on the frame, Figs. 2, 3, and 5. A shaft 38 is provided with a worm-wheel 39, that gears with a worm 40 on the driving-shaft 36. The shaft 38 is also provided with a beveled pinion 41, loose on the shaft and adapted to be held to rotation therewith by a clutch 42, splined on the shaft, Figs. 2, 3, and 4. A shaft 43, geared at one end to the pinion 41, is geared at its other extremity to a shaft 44 which latter shaft is in turn geared to the shaft 5, carrying thereon wheels meshing with the bars of the match-carrier. Also a shaft 45 is geared at one extremity to the pinion 41 and at its other extremity is geared to the shaft 6, having wheels thereon that mesh with the bars of the carrier. These shafts 5 and 6, driven continuously from the driving-shaft, cause the continuous travel of all that portion of the carrier at the right thereof in Fig. 2. For disconnecting these shafts 5 and 6 from the driving-shaft a bell-crank lever 46, Fig. 3, pivoted at its angle on the frame, is provided with furcate arms that ride in an annular groove therefor in the clutch 42, Fig. 2, and the other arm of the bell-crank is connected by a rod 47, Fig. 3, to a radial arm on the rock-shaft 31, Fig. 1, and thence through the rod 33 to the rock-shaft 34, provided with the lever-handle 35, whereby by the tilting of the lever-handle 35 these shafts 5 and 6 are put out of or into action concurrently with the lifting or lowering of the auxiliary frame 14. The driving-shaft 36 is also provided with a gear-wheel 48, that meshes with a gear-wheel 49, loose on a cranked shaft 50, and this wheel 49 also meshes with a gear-wheel 51, loose on shaft 52. The shaft 52 is provided with a clutch 53, splined on the shaft and adapted to engage with the hub of the wheel 51 and hold it to rotation with the shaft. For shifting the clutch 53 into and out of engagement with the hub of the wheel 51, Fig. 5, a lever 54 is pivoted at one extremity to the frame and straddles the clutch, being provided with pins that project therefrom into an annular groove in the clutch, and at its other extremity is connected by a rod 55 to one arm of another lever 56, pivoted medially on the frame and connected at its other extremity by a rod 57 to a crank-arm 58 on the rock-shaft 34, Fig. 1. By the tilting of the rock-shaft 34 the clutch 53 is shifted, disconnecting the shaft 52 operatively from or putting it into action with the driving-shaft.

The shaft 52 is provided with a disk 59, Fig. 2, having on its face a curved crown-tooth 60, about one-half of the length of which, from its inner end, is concentric with the shaft 52, and the remainder of the tooth is a helically-curved cam, the ends of the curved tooth being substantially opposite each other, one nearer to and the other at a greater distance from the axis of the shaft. A shaft 61 is provided with a ball-toothed wheel 62, Fig. 22, that meshes with the curved crown-tooth and cam 60, whereby the shaft 61 is caused to rotate intermittingly, the shaft being held stationary during the one half of the revolution of the disk 59, and being slowly rotated to the extent of the distance between teeth on the wheel 62 during the remainder of the rotation of the disk 59 by the cam portion of the tooth 60. The shaft 61 is geared medially to a shaft 63, which shaft 63 at its respective ends is geared to the shafts 3 and 4, whereby the shafts 3 and 4 and that portion of the match-carrier running thereon are driven intermittingly.

Figures 14, 15, 16, 22:
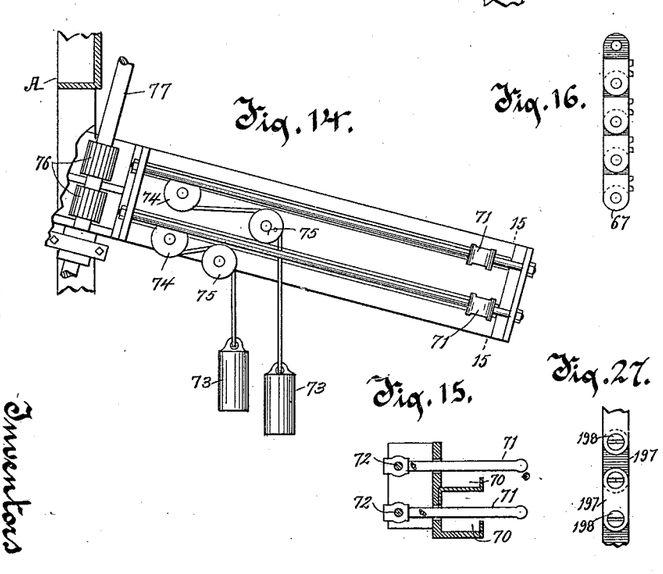
Fig. 14 is a side view of the block-feeding mechanism.
Fig. 15 is a transverse section on line 15 15 of Fig. 14.
Fig. 16 is an edge view of a fragment of the match-carrier.
Fig. 22 is a detail of a gear and cam for driving a portion of the carrier intermittingly.

The carrier 1 is constructed of transverse bars 64, each bar preferably being cast integrally, Figs. 16, 17, and 18, and each bar consisting of the medial body portion 65, the neck or shank portions 66 at the respective ends of the body portion, and a head 67 on the end of each neck or shank. The body portion of each bar is pierced transversely with a number of match-stick apertures 68, which apertures at the front of the bar are flaring or funnel-shaped, and just at the rear of the funnel-shaped aperture they open into a longitudinal groove 69, extending in the rear part of the body the entire length thereof. The shanks 66 are preferably cylindrical and serve as rundles with which the teeth on the wheels on shafts 3, 4, 5, and 6 mesh. The heads 67 are each formed with a tongue and tenon, whereby the bars are linked together by pins forming a flexible carrier, as shown in Figs. 16 and 17. The other disks or non-toothed wheels on which the carrier is supported and travels bear also against the shanks 66 of the bars of the carrier.

For supplying the machine with the material from which the match-sticks are cut, which material is wood in blocks, the length of which in the direction of the grain of the wood is that of the length of the match-sticks to be produced, we provide a feed-box, Figs. 1, 3, 4, 5, 10, 13, 14, and 15, in which the wood blocks are supported and fed up to the cutters. The feed-box is disposed in an oblique position to the horizontal plane of the cutters, Fig. 4, so that the blocks rest on the inclined bottoms of the troughs of the box and on these bottoms have a firm and unyielding support, holding the block or blocks steadily in position upwardly in front of the cutters. The feed-box consists of two elongated troughs 70 70, located one above the other, the discharging oblique ends of which are open at the top and the initial portions of which troughs are open at the sides. The initial or receiving portions of the troughs are each provided with a finger 71, Figs. 13, 14, and 15, extending transversely across the troughs, which fingers passing in slots therefor through the rear walls of the troughs are mounted on rods 72, fixed on the box, and these fingers are slidable on the rods, being adapted to push the blocks forwardly and upwardly in the troughs. Weights 73 are attached to the fingers 71 by means of cords that run over pulleys 74 75, the weights being adapted to move the fingers and the loads forwardly up the troughs. Medially of the feed-box corrugated feed-rollers 76 76 are provided, which are located in pairs opposite each other at the two sides of each of the troughs, which feed-rollers are adapted to take and bear against the wood blocks as they are delivered thereto in the troughs from the initial portions thereof and feed the blocks forwardly up the troughs to the cutters. These feed-rollers 76 are fixed on shafts 77 77, that are geared to a shaft 78, which in turn is geared to a shaft 79, Figs. 1, 4, and 5, provided with a ratchet-wheel 80. This shaft 79 and the rollers 76 are rotated intermittingly by a pawl 81, hinged on a medially-pivoted lever 82, which lever is provided with an antifriction-roller bearing that rides on an eccentric cam 83 on shaft 50. The lever 82 is held yieldingly against the cam 83 by a spring 84, and the pawl 81 is held yieldingly to the ratchet-wheel 80 by a spring 85. The construction and disposition of the parts is such that the wood blocks are moved intermittingly in front of the cutters at that period of time when the cutters are withdrawn from the blocks. A bar 86, Figs. 5, 10, 11, and 13, secured to the rear wall of the feed-box at its discharging end, is provided with a shard edge turned slightly inwardly and with a series of abutment-pins 87, preferably on projecting fingers, the front ends of which pins are a little back of the inner surface of the rear wall of the feed-box and are so disposed as to be opposite, and thereby to be adapted to receive against them the ends of the match-sticks S as they are cut from the wood blocks B. The front wall of the feed-box opposite the cutters consists of an independent plate 88, also having a sharp inwardly-turned edge mounted on the free ends of radial arms 89 89, fixed on a rock-shaft 90, which rock-shaft is provided with a rearwardly-extending radial arm 91, provided with a spring 92, adapted to throw the plate 88 against the front surface of the wood blocks B and hold them firmly against the rear wall of the feed-box. A hand-wheel 93 on the shaft 78 is a means by which the attendant can rotate the feed-rollers 76 independently of the running of the machine, to a limited extent, when desirable.

Figure 7:
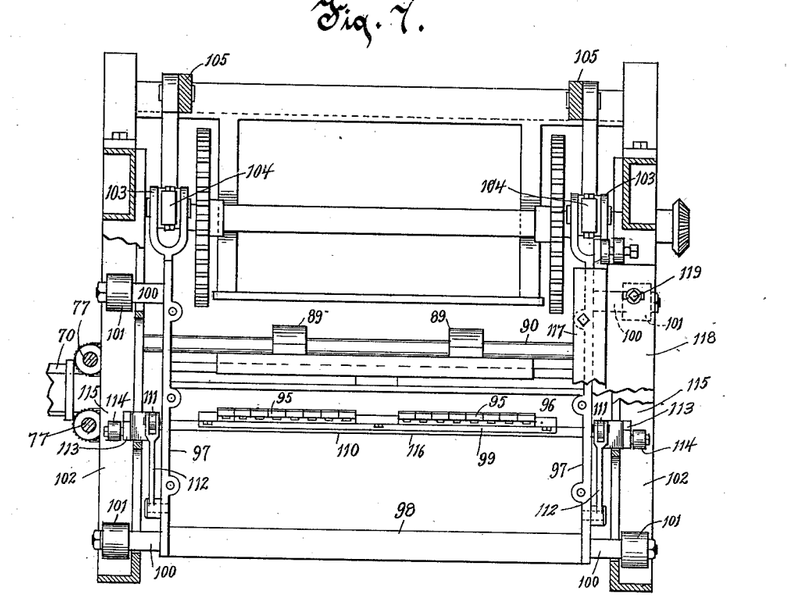
Fig. 7 is a detail in plan (the frame being in section) of the stick-cutting and block-holding mechanism.
Figure 8:
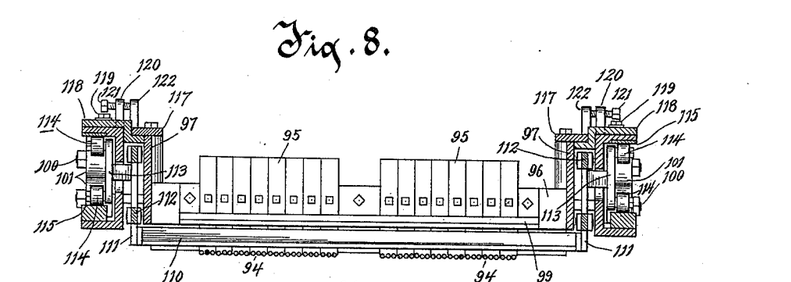
Fig. 8 is a detail in section of the cutters and abutment-bar with parts of the mechanism for operating them, the view showing parts seen also in Fig. 7, but at a right angle thereto.
Figure 9:
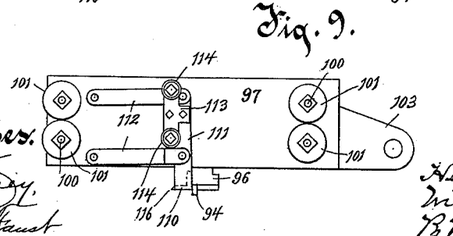
Fig. 9 is a side view of the carriage supporting the cutters and the abutment-bar, the construction shown being at the end of the construction shown in Fig. 8.
Figure 10:
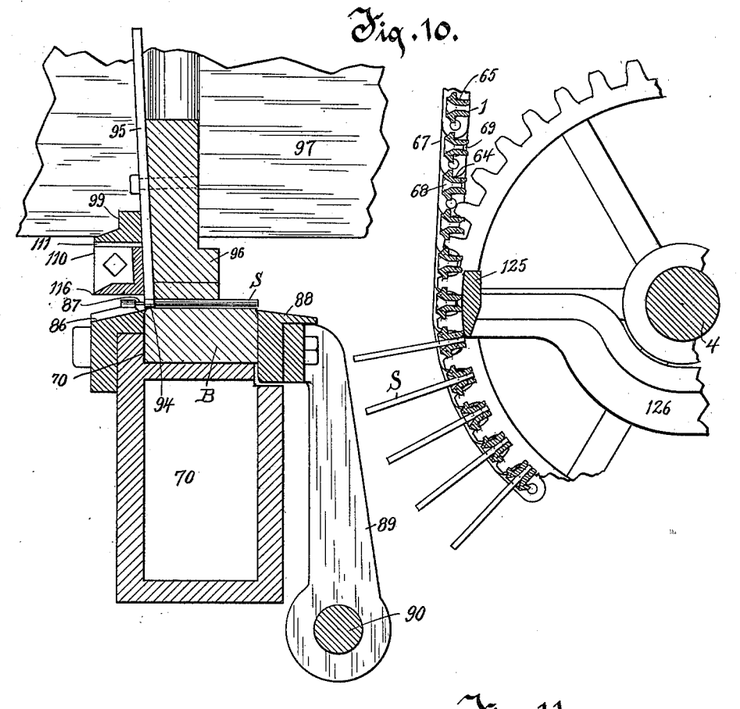
Fig. 10 is a detail, enlarged and partially in section, of mechanism for holding the wood blocks, of the cutters and related parts, of a fragment of the carrier, and illustrating the method of cutting the sticks from the blocks and inserting them in the carrier.
Figure 12:
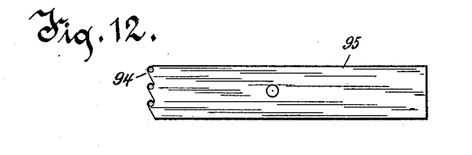
Fig. 12 shows one of the cutter-bars which has three cutters thereon.
Figure 13:
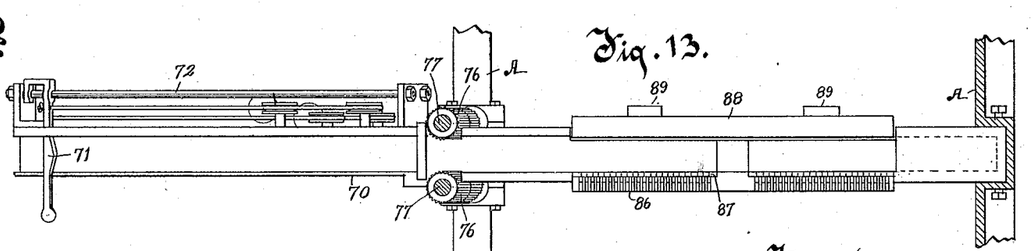
Fig. 13 is a plan view of the block holding and feeding device.

For cutting the match-sticks from the wood blocks a large number of cutters are provided, and these cutters preferably consist of apertured knives 94, Figs. 8, 10, and 12, a plurality of which, advisably not less than three, are formed in the ends of a cutter-plate 95, the knives being so disposed as to cut substantially at a right angle to the plane of the plate. These cutter-plates are secured in series by bolts on a cutter-bar 96, which cutter-bar, with the side bars 97 97 and another cross-bar 98, forms the carriage, preferably constructed integrally, on which the cutter-plates are mounted and are carried. A holding-bar 99, placed against the cutter-plates 95, is bolted to the cutter-bar 96 and reinforces the securing cutter-plates in position on the cutter-bar. The side plates 97 of the cutter-carriage, Figs. 1, 2, 7, 8, and 9, are provided with laterally-projecting stud-pins 100 100, on which antifriction-wheels 101 101 are mounted in pairs, which wheels in each pair bear against each other inwardly, and outwardly (upwardly and downwardly) travel on the horizontal ways 102 102 on the frame. By this construction the carriage is supported and adapted to travel forward and back on the frame. The side plates 97 are provided with rearwardly-extending furcate ears 103 103, and links 104 104, Figs. 1, 2, 5, and 7, pivoted in these ears 103, connect the carriage to radial arms 105 105 on rock-shaft 106, and a radial arm 107 on the rock-shaft is connected by a pitman 108, Figs. 3 and 5, to a wrist in the cranked shaft 50. The pitman 108 is preferably provided with a turnbuckle 109 for lengthening or shortening the pitman, as desired. The construction and arrangement of the parts is such that the cutter-carriage is reciprocated to cut the sticks S from the wood blocks concurrently with the forward movement of the carrier and to carry the sticks to and force them into the carrier at a period of rest of the carrier.

In Fig. 10 a cutter is shown in the position it has when it has just completed cutting a stick S from the block B, and in which position an abutment-pin 87 is in front of the match-stick S. In the drawing the cutter-carriage is at the limit of its movement toward the front of the machine and immediately thereafter commences its rearward movement, carrying the sticks with it to and inserting them in a bar of the carrier 1. For a bearing or abutment against the ends of the match-sticks at the front of the cutters, adapted by the motion of the cutter-carriage to force the match-sticks endwise rearwardly into the bar of the carrier, an abutment-bar 110 is provided, Figs. 5, 7, 8, 9, and 10, which abutment-bar at its ends is bolted to vertically-disposed supports 111, which supports are pivoted, respectively, on the free extremities of parallel swinging arms 112 112, hinged on the side plates 97 97 of the cutter-carriage. This construction provides for an up-and-down movement of the abutment-bar on supports that are constantly upright in position, that when thrown down to the limit of their travel bring the abutment-bar 10 squarely in front of and close to the cutters 94, and that when raised lift the abutment-bar from in front of the cutters and carry it a little away from them. For raising and depressing the abutment-bar at the proper time brackets 113 are secured rigidly to the supports 111, and these brackets are provided with bearing-wheels 114, which bear upwardly and downwardly on ways 115 115 therefor on the frame, Figs. 2 and 8. These ways extend in the general direction of the travel of the cutter-carriage and are provided with offsets or change of direction of the ways, so disposed as to carry the abutment-bar 110 down in front of the cutters during the movement of the cutters toward the match-carrier and immediately after the abutment-bar has passed the vertical plane of the front ends of the abutment-pins 87. The abutment-bar 110 remains in this position in front of the cutters until the cutter-carriage has returned to the location at which the abutment-bar was lowered, when it is again raised to the position shown in Fig. 10. The lower front edge of the abutment-bar 110 is formed into a knife-edge 116, and this knife-edge is adapted to cut the splints or roughened surface off the wood blocks left from cutting sticks out of them, thus preparing them for the renewed cutting of sticks therefrom.

For guiding the carriage in its travel forward and back, and also for so adjusting the carriage that the cutters will register with the abutment-pins 87, the carriage is provided with straight-edged plates 117, bolted to the top edges of the plates 97, Figs. 7 and 8, and these plates serve as guards that bear laterally against shoulders on plates 118, which plates 118 are secured adjustably on the frame by bolts 119, passing through slots therefor in the plates 118 and turning into the frame. Lugs 120 on the frame are provided with adjusting-screws 121, that turn against lugs 122 on the plates 118, whereby the plates 118 may be adjusted laterally, thus adjusting the position of the carrier and forming ways for the travel of the carriage reciprocally.

For putting the cutter-carriage into and out of action a clutch-collar 123, Figs. 3 and 5, splined on the shaft 50, is adapted to engage releasably the hub of the wheel 49, loose on the shaft 50, and hold the shaft to rotation with the wheel. A bell-crank lever and handle 124, pivoted at its angle to the frame, has one arm, the free extremity of which is furcate, and is provided with pins that ride in an annular groove therefor in the clutch 123, while the other arm of the bell-crank serves as a handle by which the attendant can shift the clutch. By this construction the cutters can be put out of action while the machine otherwise is running.

In the organized machine as shown in the drawings the cutter-carriage reciprocates in a substantially horizontal plane, taking the match-sticks as cut from the blocks toward and inserting them in the match-carrier at a locality where the carrier is running in a substantially vertical direction downwardly and where the carrier is engaged by the toothed wheels on shaft 4, and there is behind the carrier, between the wheels, on this shaft a carrier abutment-bar 125, Fig. 5, fixed on arms 126, rigid on the frame. This carrier abutment-bar 125 is located behind the carrier, directly opposite the bar into which the match-sticks are inserted and is so close thereto as to form an abutment against which the carrier is pushed temporarily by the thrust of inserting matches therein from the other side. From the locality of inserting the match-sticks in the carrier the travel of the carrier transports the matches around and past the wheels on the shaft 8 and thence over and past the wheels on the shaft 6 and down to the wheels on the shaft 11, Figs. 1, 2, and 5, and in thus passing from the locality of the shaft 8 above and past the locality of the shaft 6 to the locality of the shaft 11 the match-sticks are presented for a considerable distance to a heater 127. This heater is a steam-tight box divided into two compartments by a central partition extending from the bottom nearly to the top thereof, the heater being intended to be supplied with hot water or steam, preferably steam, by means of the pipes 128 128, through one of which steam or hot water is introduced into the heater and through the other of which the steam or hot water is discharged therefrom. The heater-box is substantially as long as the width of the match-carrier and is of considerable height, so that the match-sticks are presented thereto and thereby heated, while passing up on one side adjacent to the box and down on the other side adjacent to the box for a considerable distance, thus economizing the radiation of the heat from the box at both sides thereof.

Figure 6:
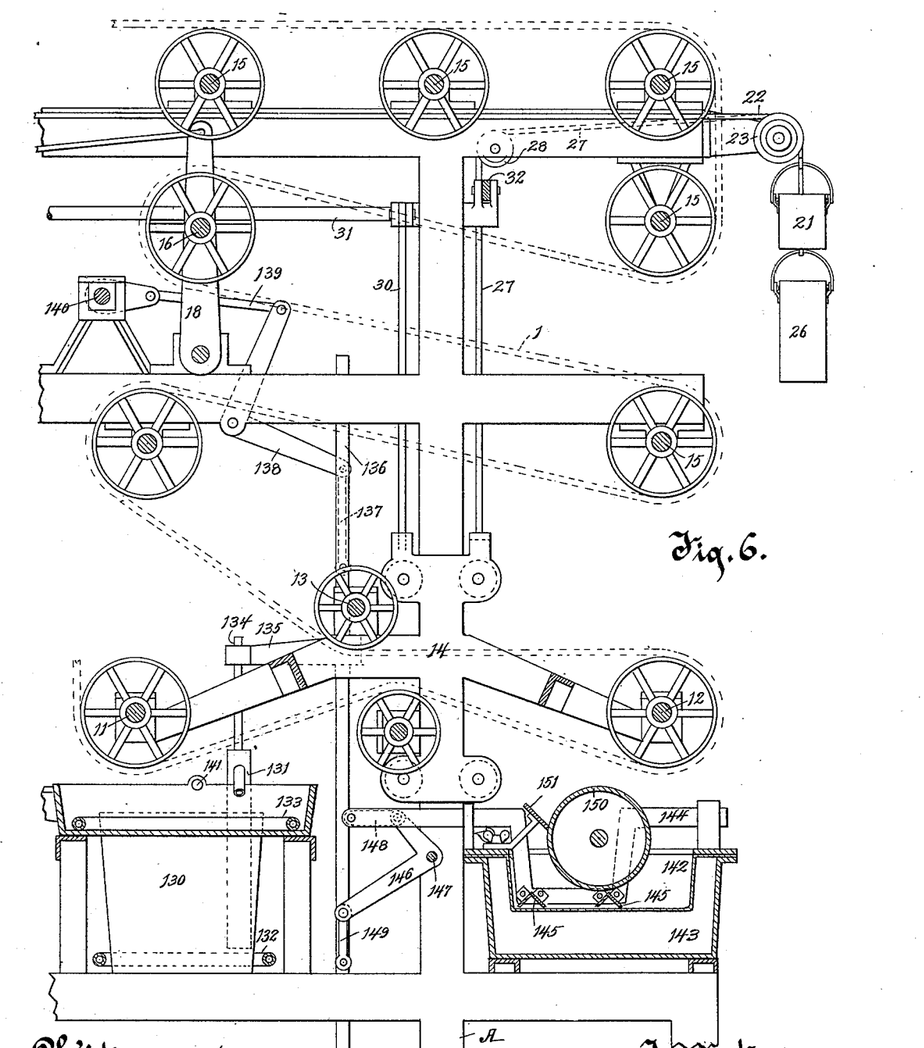
Fig. 6 is a vertical section centrally longitudinally of the rear portion of the machine at the left in Fig. 1.

Directly below the shaft 11 a pan 129 is provided, Figs. 1, 2, and 6, which is supplied with melted paraffin or other suitable inflammable material to be applied to the match-sticks and into the liquid-supply of which paraffin the sticks are passed while traveling around the wheels on shaft 11, the frame 14 being lowered to a position that takes the match-carrier so near to or so far into the pan 129 that the matches in the carrier are carried into and through the liquid paraffin therein, being thereby coated with the paraffin for a considerable portion of their length. For supplying the pan 129 with melted paraffin a supply-tank 130 is provided, and the melted paraffin is conveyed from the tank into the pan by means of a lifting-pump 131. The paraffin in the tank and in the pan is kept in a liquid condition by means of steam-heated pipes 132 and 133, coiled, respectively, about the tank and in the pan.

The pump piston-rod 134 is connected adjustably to an arm 135, secured adjustably on a rod 136, reciprocable vertically in bearings therefor on the frame. The rod 136 is connected by a link 137 to one arm of a bell-crank 138, pivoted on the frame, the other arm of which bell-crank is connected by a link 139 to the crank of a shaft 140, which shaft is geared to the shaft 38, Figs. 1, 2, 3, and 6. By this construction the pump is actuated constantly when the driving-shaft 36 is in motion. An overflow-spout 141 in the upper part of one side of the paraffin-pan discharges the excess of melted paraffin from the pan into the tank, whereby the paraffin is kept more readily in a fluid condition and constantly in motion. A little farther along in the direction of the movement of the carrier a composition-pan 142 is provided, adapted to hold a composition of ignitible material in fluid condition to be applied to the ends of the match-sticks to form ignitible heads thereon. The composition-pan 142 is suspended in a hot-water-bath tank 143, whereby the ignitible composition is kept in fluid condition. Horizontally-disposed bars 144 144 are mounted in supports therefor directly above the composition-pan, and these bars are bent down into the composition-pan, extending nearly to the bottom thereof, and are connected together rigidly by angle-irons 145 145, forming paddles located near the bottom of the composition-pan, which paddles and the bars 144, with which they form a framing constructing a stirring device, are reciprocated endwise above the composition-pan. A bell-crank 146, pivoted by a rock-shaft 147 on the frame, is connected at the extremity of one arm by a link 148 to one of the bars 144, and by a link 149 the other arm of the bell-crank is connected to the vertically-reciprocable rod 136. Also a radial arm 146' on the rock-shaft 147 is connected by a link 148' to the other bar 144, Fig. 2. By this construction the stirring device is reciprocated constantly in the composition-pan when the driving-shaft is in operation. A composition-roller 150 is mounted on the composition-pan and so as to dip into the composition in the pan and carry it upwardly over the roller, and the carrier, passing around the wheels on shaft 12, is so located with reference to the composition-roller that the ends of the match-sticks therein are thrust into the composition on the roller as the sticks pass the roller. A scraper 151, fixed on the pan, is so disposed with reference to the roller as to remove therefrom any excess of composition being taken up thereby and turn it back into the composition-pan. A shaft 152, Fig. 2, geared to the journal of the composition-roller, is also geared to shaft 38 and rotates the composition-roller constantly when the driving-shaft is in operation.

When the match-sticks have been provided with ignitible heads by passing them through the composition on the composition-roller 150, the thus-completed matches are transported in the match-carrier for a considerable distance in the air, during which period the ignitible composition or heads on the matches sets and to considerable extent hardens before the matches are discharged from the carrier. The route of the carrier is indicated in dotted lines on Figs. 1 and 2. In the course of this route the carrier passes around the wheels on shaft 16, which shaft is mounted in the swinging arms 18, and these arms are constantly under the strain of the weights 21, whereby any slack in the carrier at this locality occurring by the raising of the auxiliary frame 14 or otherwise is taken up. When the matches being transported by the carrier reach the locality of the shaft 3, Figs. 1, 2, and 5, they are discharged from the carrier by a device therefor that acts against the matches from the rear surface of the carrier and forces them downwardly out of the carrier. The match-discharging device consists of a bar 153, located above and disposed transversely of the carrier at a locality where it is at the under side of and in mesh with the toothed wheels on shaft 3, Figs. 4 and 5. This transverse bar 153 is secured to hangers 154 154, depending from the ends of levers 155 155, that are pivoted at their other extremities on the frame. These levers are provided medially with pins 156, that ride in cam-grooves therefor in disks 157, Figs. 3 and 5, on the driving-shaft 36. By this construction the plunger-bar 153 is supported in an elevated position during most of the time, but at the proper moment is forced down as a plunger into a groove 69, Figs. 17 and 18, in a bar of the carrier and against the ends of the match-sticks therein, forcing them downwardly therefrom and out of the carrier. The notches in the lower edge of the bar 153, Fig. 4, are not ordinarily required in the bar, but are shown, as such notches are required when the bar is used in connection with a form of carrier-bar shown in Figs. 24 and 25, hereinafter to be described. The notches permit the bar to straddle the bolts employed in that form of carrier.

For receiving the matches as they are discharged from the carrier and placing them straight and in required numbers in boxes therefor we provide devices as follows: A dumping-rack 157, Figs. 1, 2, 5, and 21, consisting of a corrugated or channeled bottom having a rear and end walls, is mounted on radial arms on a rock-shaft 158, which rock-shaft is journaled in the frame. The rack is as long as the width of the carrier and is provided with as many grooves or channels as there are matches in a transverse row of matches in the carrier, and the rack is so disposed with reference to the carrier that the matches discharged from the carrier drop severally into a channel therefor in the rack, and are thereby held in position to be dumped in parallel positions in layers into boxes therefor below. The rack or bottom 157 is provided at its front edge with a slightly-raised wall 159 to prevent the sliding of the matches out of the rack in that direction when the rack is swung over. The width of the rack is a little more than the length of the matches, so that they will lie loosely thereon. For dumping the rack when it has received its load regularly and intermittently a link 160 connects a crank on the rock-shaft 158 to a bell-crank 161, Figs. 1 and 3, which bell-crank is pivoted on the frame, and the other arm of which is provided with a pin that rides in an eccentric channel therefor in a disk 162 on the driving-shaft 36.

Below the dumping-rack 157 we provide an endless apron 163, running on sprocket-drums on shafts 164 and 165, Figs. 1 and 5, which apron is advisably made of flexible sheet metal and is provided with transverse recessed tracks 166, located in pairs adapted to receive thereon removably and between each pair of tracks a trough-like tray 167, having open ends. These trays are each adapted to receive therein and removably therefrom a match-box 168, the construction being such that the boxes severally are brought to a proper position below the dumping-rack 157 to receive therefrom the matches as the rack is tilted over, dumping the matches in layers and in equal numbers therein. The attendant places the trays, with match-boxes therein, on the endless apron from time to time and removes the boxes and trays therefrom when the boxes are filled. The apron 163 is provided with bosses or teeth 169, that enter sockets therefor in the drums on the shafts 164 and 165, compelling the travel of the apron when the shaft 164 is rotated.

Figures 19, 20, 21:
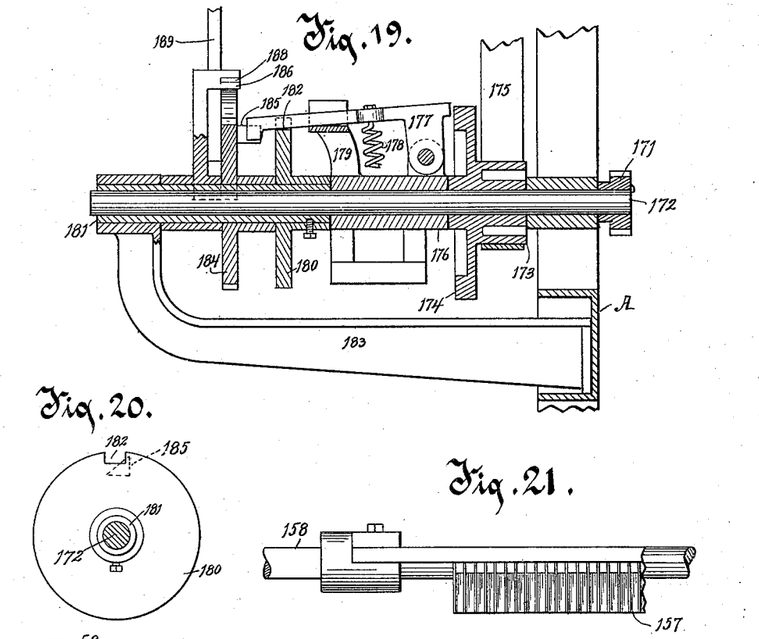
Fig. 19 is a section of mechanism adapted for feeding intermittingly the match-box belt.
Fig. 20 shows a disk that supports and engages a clutch, the disk being a member of the mechanism shown in Fig. 19.
Fig. 21 shows a fragment of the match-boxing devices.

For rotating the shaft 164 intermittently and to a sufficient extent to move one box 168 from its position below the rack 157 and moving a succeeding box into position below the rack a toothed wheel on the shaft 164 meshes with a toothed wheel on shaft 170, and the wheel on shaft 170 meshes with a pinion 171 on shaft 172, Figs. 1, 5, and 19. A pulley 173, loose on the shaft 172, is provided with a crown-disk 174 and is rotated constantly by a belt 175, running thence on the driving-shaft 36. A hub 176, fixed on the shaft 172, is provided with a swinging lever-clutch 177, adapted to contact frictionally with the crown-disk 174, whereby the shaft 172 is rotated temporarily with the pulley 173. The lever-clutch 177 is pivoted on a radially-projecting lug on the hub 176, and a contractile spring 178, Figs. 4 and 19, attached to the clutch and to a lug on the hub 176, is adapted to hold the clutch yieldingly out of engagement with the crown-disk 174. A radial arm 179 on the hub 176 at its outer end is furcate and forms a guide and stop, directing and limiting the movement of the lever-clutch. A disk 180, secured detachably on a sleeve-box 181, is provided with a notch 182, Figs. 19 and 20, in which the arm of the clutch-lever 177 rests when the clutch is not in contact with the crown-disk 174, and when the arm of the clutch is lifted out of the notch 182 it rides around on the periphery of the disk as the hub 176 rotates, being clutched to the hub 173. The sleeve-box 181 is rigid in the bracket 183, which bracket is fixed on the frame A, and at its outer end supports the outer extremity of the shaft 172, the sleeve-box 181 being the bearing therefor. A ratchet-wheel 184, Figs. 1, 2, and 19, is revoluble on the sleeve-box 181. This ratchet-wheel is provided with a crown-tooth beveled on one surface, forming a cam 185, adapted as the ratchet-wheel is rotated to engage the lever of the clutch 177 and lift it out of the notch 182 in the stationary disk 180. A crank 186, pivoted on the sleeve-box 181, is provided with a pawl 187, that engages the teeth of the ratchet-wheel 184. A spring 188, fixed on an arm of the crank 186, bears on the pawl 187 and holds it yieldingly in engagement with the teeth of the ratchet-wheel. A connecting-rod 189 connects the wrist of the crank 186 to a pin 190, eccentric and adjustable eccentrically on a disk 190 on the driving-shaft 36. The construction is such that when the ratchet-wheel 184 is by the action of the crank 186 rotated one revolution the cam 185 tilts the lever-clutch 177 into frictional engagement with the crown-disk 174, and the hub 176 and the shaft 172 therewith are rotated one revolution, causing the apron 163 to travel in its orbit sufficiently to move the boxes 168 forward, so that a succeeding box is moved into position of the preceding one theretofore in position to receive the matches dumped from the rack 157.

When the match-carrier is stopped by shifting the lever 35, it is desirable that the block-feed should be stopped simultaneously, even though the driving-shaft and the shaft 50 continue to rotate. For this purpose a cam-lever 191, Figs. 1 and 5, pivoted at one extremity on the frame, is provided medially with a stud-pin 192, provided with an antifriction bearing-wheel that bears against the pawl 81, and this lever 191 is connected at its free end by a rod 193 to a radial arm on the shaft 34, the construction being such that when the shaft 34 is oscillated to put the carrier out of action the lever 191 at the same time forces the pawl 81 against the action of the spring 85 out of engagement with the ratchet-wheel 80, whereby the block-feed mechanism is stopped.

Figure 24:
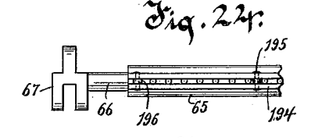
Fig. 24 illustrates a fragment of a modified form of bar forming a part of the match-carrier.
Figure 25:
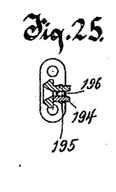
Fig. 25 is a transverse section of the modified form of bar shown in Fig. 24.

Figs. 24 and 25 show a modified form of construction of bar for the match-carrier, in which one wall 194 of the groove 69 in the bar is made detachable. This detachable wall of the groove is secured to the other wall of the groove by bolts 195, passing at intervals through the two walls, there being collars 196 about the bolts between the walls to keep them separated from each other a proper distance.

Figure 26:
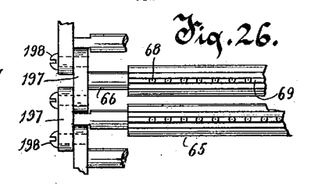
Fig. 26 illustrates a detail of another modified form of match-carrier.

Figs. 26 and 27 show still another modified form of construction of bars for the carrier, in which the heads 197 of the bars are extended laterally thereof in a single-bar form, and in this form of construction the carrier-bars are made alternately longer and shorter, so that the links or heads 197 on the shorter bars will overlap on the inside the links or heads on the longer bars, and these links or heads are pivoted together by pins having screw-thread thereon, which pins pass through the outer links and turn by their threads into the inner links or heads.

Figure 11:
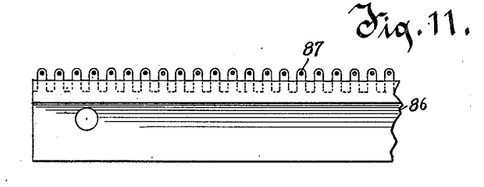
Fig. 11 is a front view of a fragment of the bearing member at the side of the material block, showing the pins forming a part thereof that are behind and are bearings for the sticks being cut from the block.

The pins 87 on the bar 86 are preferably fixed on fingers projecting from the bar, as shown in Fig. 11, thereby providing interfinger spaces through which the slivers from the wood blocks readily pass, thus freeing the machine of them.

What we claim as our invention is—

1. A flexible match-carrier, comprising a considerable number of transversely-disposed bars each bar pivoted to the two adjacent bars at both ends, and each bar consisting of an elongated enlarged body part provided with stick-apertures and a longitudinal groove intersecting all the apertures, reduced shanks extending from the ends of the medial body part, heads tongued and tenoned laterally in opposite directions, and pins through each tongue and the walls of the tenon in which the tongue is inserted.

2. A flexible match-carrier, comprising a considerable number of transversely-disposed bars each bar pivoted to the two adjacent bars at both ends, and each bar consisting of an elongated enlarged body part provided with stick-apertures and a longitudinal groove intersecting all the apertures, reduced shanks extending from the ends of the medial body part, and means at the extremities of the shanks connecting the bars flexibly to each other.

3. In a carrier of a match-machine, a carrier-bar comprising a medial body part provided with transverse stick-apertures and a longitudinal groove intersecting all the apertures the portion of the apertures not thus intersected by the groove being flared outwardly from the groove.

4. In the carrier of a match-machine, a carrier-bar comprising a medial body part provided with transverse stick-apertures and a longitudinal groove intersecting all the apertures, one wall of the groove being detachable from the bar.

5. In a match-machine, means for driving a match-carrier intermittently, comprising a rotated shaft provided with a disk having thereon an elongated curved crown-tooth, an arc of which is helical to the axis, another shaft having peripheral teeth adapted to mesh with the aforesaid helical tooth, and means transmitting the motion of the latter shaft to the carrier.

6. In combination in a match-machine, an endless match-carrier carried on rotating wheels, a driven shaft rotating continuously, a disk on said shaft having thereon a crown-tooth curved entirely around the axis of the shaft a portion of the curve being concentric to the axis of the shaft and another portion being helically cam-formed to the same axis, another shaft having a wheel provided with peripheral teeth meshing with said curved tooth, and a third shaft geared to the second shaft and transmitting the intermitting motion thereof to the shaft of carrier-carrying wheels.

7. In a match-machine, a rotating shaft 140, a reciprocating rod 136 a bell-crank and links connecting said rod to a crank on said shaft, a paraffin-pump provided with a reciprocating pump-rod, an arm on said reciprocating rod to which said pump-rod is attached, a composition-pan, a reciprocable frame provided with stirrers in said pan, and a bell-crank and links connecting said reciprocable stirrer-frame to said reciprocating rod.

8. In combination in a match-machine, a composition-pan, a frame supported and reciprocable above the pan, the frame having a medial portion bent down into and disposed horizontally near the bottom of the pan, transverse bars in oblique planes on said frame in the pan adapted to stir the composition when the frame is reciprocated, and means for reciprocating the frame and the stirrers thereon.

9. In combination in a match-machine, a frame, an endless flexible match-carrier supported and traveling on numerous wheels mounted on the frame, a paraffin-pan and a composition-roller at a little distance apart, an auxiliary frame movable vertically on the main frame and provided with wheels on and below which the carrier runs above the paraffin-pan and the composition-roller, and means for raising the auxiliary frame and the carrier thereon above said pan and roller.

10. In a match-machine, the combination with a main frame, a flexible match-carrier, and a paraffin-pan and a composition-roller at a little distance apart, of an auxiliary frame movable vertically on the main frame, wheels in the auxiliary frame at a distance apart and respectively over the paraffin-pan and the composition-roller under which wheels the carrier runs, and intermediate wheels also on the auxiliary frame on and above which the carrier runs being thereby deflected upwardly between the paraffin-pan and the composition-roller, and means for raising the auxiliary frame and the carrier away from the paraffin-pan and the composition-roller.

11. In a match-machine, the combination with a main frame, and a paraffin-pan and composition-roller at a distance apart in substantially the same horizontal plane, of a flexible match-carrier, an auxiliary frame extending laterally above said pan and roller and movable vertically on the main frame, wheels mounted in the auxiliary frame on and under which the carrier runs, weights attached to and supporting the auxiliary frame and its load in counterpoise, and means for lifting the auxiliary frame and the carrier thereon away from said pan and roller.

12. In combination, a frame, an endless flexible match-carrier mounted thereon a portion of which travels intermittingly and another portion of which travels continuously, swinging arms 9 provided with wheels on which the carrier is supported at the locality of change of movement from continuous to intermitting travel, other swinging arms 10 provided with wheels on which the carrier is supported at the locality of change of movement from intermitting to continuous travel, and a rod or rods 25 connecting the two sets of swinging arms whereby concurrent and compensating yielding and taking up of the carrier is provided for at the localities of change of movement.

13. In combination in a match-machine, a flexible carrier, shafts 8, 11, at a little distance apart on and around which the carrier travels, an intermediate shaft 6 at one side of a plane through the first two enumerated shafts around which the carrier travels in a U-shaped course, and a box-like closed heater located between the parallel lines of this U-shaped course of the carrier, the construction being such that match-sticks in the carrier are transported in the air exteriorly of the heater past the heater and are exposed to its exterior surface for a considerable distance at both sides and at one end thereof.

14. In a match-machine, the combination with a frame provided with parallel oppositely-disposed ways, of a cutter-carriage provided with a plurality of pairs of bearing-rollers, the rollers of each pair being arranged to bear inwardly against each other and outwardly to travel on said ways on the frame.

15. In a match-machine, the combination with a frame provided with parallel oppositely-disposed ways, of a cutter-carriage provided with a plurality of pairs of bearing-rollers, the rollers of each pair bearing in opposite directions on said ways, guard-plates on the carriage and complementary guard-plates on the frame on which the first-enumerated plates rest and travel.

16. In a match-machine, the combination with a frame provided with parallel oppositely-disposed ways, of a cutter-carriage provided with a plurality of pairs of bearing-rollers, the rollers of each pair bearing in opposite directions on said ways, guard-plates on the carriage, and complementary guard-plates on the frame the complementary guard-plates provided with longitudinal shoulders against which the lateral edges of the guard-plates on the carriage bear movably, and means for adjusting the plates on the frame toward and from the plates on the carriage.

17. In a match-machine, the combination of a cutter-carriage, cutters in alinement in the carriage, an abutment-bar, reciprocable supports movable at right angles to the movement of the carriages to which the abutment-bar is secured, sets of parallel swinging arms pivoted on the carriage-frame to the extremities of which arms in pairs the supports are pivoted, and means for guiding the supports and abutment-bar up and down by the movement of the carriage laterally.

18. In a match-machine, the combination of a laterally-reciprocable cutter-carriage, cutters in alinement in the carriage, an abutment-bar provided with a knife-edge, means for automatically shifting the bar to in front of the cutters by the reciprocating movement of the carriage in one direction whereby the bar is made to serve as a pusher on sticks in the cutters during the movement of the carriage in that direction, and in the same position to cut splints from the match-blocks as the carriage moves in the reverse direction and to be lifted from in front of the cutters on further movement of the carriage.

19. In a match-machine, the combination with a match-carrier composed of bars, each bar having transverse stick-apertures and a longitudinal groove intersecting the apertures, of a plunger-bar adapted to enter the groove of said carrier-bars and push the matches therefrom, and means for reciprocating the plunger-bar toward and from the carrier.

20. In a match-machine, the combination with a match-carrier and means for discharging matches therefrom downwardly loosely, of a rack having channels adapted to receive the discharged matches therein, one match in each channel, a rock-shaft, radial arms on the rock-shaft on which said rack is mounted in such manner that when thrown upwardly by the partial rotation of the rock-shaft the rack will be below the carrier in position to receive and hold the matches discharged therefrom severally in a channel of the rack therefor, and means for oscillating the rock-shaft for dumping the matches.

21. In a match-machine, an endless flexible box-carrier carried on sprocket-drums, a shaft 172 geared to the shaft of one of said sprocket-drums, means for rotating said shaft 172 intermittently comprising a driven pulley provided with a crown-disk loose on said shaft, a hub tight on the shaft, a lever-clutch mounted on the hub, a ratchet-wheel concentric with and revoluble about the shaft, a cam-tooth on the ratchet-wheel adapted to tilt said lever-clutch and put it in engagement with said crown-disk, and means for rotating the ratchet-wheel.

22. In a match-machine, means for actuating a box-carrier intermittently, comprising a shaft 172, a driven pulley provided with a crown-disk loose on the shaft, a hub tight on the shaft, a lever-clutch mounted on the hub and adapted to engage the crown-disk, a sleeve-box 181 in which the shaft has a bearing, a disk 180 stationary on the sleeve-box and having a notch in its periphery, a spring holding the lever of the clutch yieldingly in the notch and permitting it to be lifted therefrom into engagement with the crown-disk and to ride around on the periphery of the lever-supporting disk, a ratchet-wheel loose on the sleeve-box, a cam-tooth on the ratchet-wheel adapted to contact with the lever of the clutch and lift it from the notch, a bell-crank loose on the sleeve-box and provided with a pawl engaging the ratchet-wheel, and means for oscillating the bell-crank.

23. In a match-machine, a device for driving a portion of the match-carrier slowly intermittently from a continuously rapidly rotated shaft, comprising the continuously-rotated shaft 52, a crown-tooth on the shaft encircling the axis of the shaft, a portion of the tooth being curved concentrically about the axis and another portion of the tooth being curved helically, another shaft 60, and a wheel on the latter shaft having ball-formed teeth adapted to mesh with said curved crown-tooth.

In testimony whereof we affix our signatures in presence of two witnesses.

HERMAN F. WUSSOW.
WILLIAM H. WUSSOW.

Witnesses:
JOHN F. HYER,
WALTER L. WELD.